United States Patent
Battlogg et al.

(10) Patent No.: US 8,292,048 B2
(45) Date of Patent: Oct. 23, 2012

(54) ENERGY ABSORBING DEVICE OPERATING WITH A FREE-FLOWING MEDIUM

(75) Inventors: Stefan Battlogg, St. Anton/Montafon (AT); Jürgen Pösel, Bludenz (AT)

(73) Assignee: Inventus Engineering GmbH, St. Anton/Montafon (AT)

( * ) Notice: Subject to any disclaimer, the term of this patent is extended or adjusted under 35 U.S.C. 154(b) by 0 days.

(21) Appl. No.: 12/137,956

(22) Filed: Jun. 12, 2008

(65) Prior Publication Data

US 2008/0245628 A1  Oct. 9, 2008

Related U.S. Application Data

(63) Continuation of application No. PCT/EP2006/011928, filed on Dec. 12, 2006.

(30) Foreign Application Priority Data

Dec. 12, 2005 (EP) .................................. 05027133

(51) Int. Cl.
 *F16F 9/53* (2006.01)
(52) U.S. Cl. .................. 188/267.2; 188/267.1; 188/268; 188/322.35; 188/374; 188/267
(58) Field of Classification Search .................. 188/267, 188/267.1, 267.2
See application file for complete search history.

(56) References Cited

U.S. PATENT DOCUMENTS

| | | | |
|---|---|---|---|
| 2,661,596 A * | 12/1953 | Winslow | 60/326 |
| 2,820,471 A * | 1/1958 | Crowell | 137/251.1 |
| 2,997,325 A * | 8/1961 | Peterson | 293/133 |
| 3,380,557 A * | 4/1968 | Peterson | 188/374 |
| 3,398,812 A * | 8/1968 | Peterson | 188/374 |
| 4,019,403 A * | 4/1977 | Kondo et al. | 74/492 |
| 4,255,986 A * | 3/1981 | Mukoyama | 74/492 |
| 4,993,747 A | 2/1991 | Borlinghaus | |
| 5,449,199 A | 9/1995 | Heinrichs et al. | |
| 5,870,930 A * | 2/1999 | Willett et al. | 74/492 |
| 6,260,675 B1 * | 7/2001 | Muhlenkamp | 188/267 |
| 6,279,952 B1 | 8/2001 | Van Wynsberghe et al. | |
| 6,514,001 B1 * | 2/2003 | Yezersky et al. | 403/109.1 |
| 6,705,559 B1 | 3/2004 | Sullivan et al. | |
| 6,749,045 B2 | 6/2004 | Rosenfeldt et al. | |

(Continued)

FOREIGN PATENT DOCUMENTS

DE 2 215 892 10/1973

(Continued)

OTHER PUBLICATIONS

European Search Report, dated May 3, 2006.

(Continued)

*Primary Examiner* — Bradley King
*Assistant Examiner* — Mahbubur Rashid
(74) *Attorney, Agent, or Firm* — Laurence A. Greenberg; Werner H. Stemer; Ralph E. Locher (57) ABSTRACT

An energy absorbing device, in particular a device for single-use occupant protection in vehicles, has a container with a magneto-rheological medium which is forced on impact through a restriction with at least one outlet channel. The flow resistance of the outlet channel may be influenced by a device for generation of a magnetic field.

19 Claims, 7 Drawing Sheets

U.S. PATENT DOCUMENTS

| | | | |
|---|---|---|---|
| 6,786,508 B2 * | 9/2004 | Fraley et al. | 280/751 |
| 7,165,786 B1 * | 1/2007 | Sha et al. | 280/775 |
| 2001/0048362 A1 | 12/2001 | Spencer | |
| 2002/0047295 A1 | 4/2002 | Sullivan et al. | |
| 2003/0217901 A1 * | 11/2003 | Carlson | 188/267 |

FOREIGN PATENT DOCUMENTS

| | | |
|---|---|---|
| DE | 198 20 570 A1 | 11/1999 |
| DE | 100 01 420 A1 | 7/2001 |
| EP | 0 594 173 A1 | 4/1994 |
| EP | 0 925 997 A2 | 6/1999 |
| EP | 1 060 961 A1 | 12/2000 |
| EP | 1060974 A1 | 12/2000 |
| JP | 11-348792 A | 12/1999 |
| WO | 00/29264 A1 | 5/2000 |
| WO | 00/37298 A1 | 6/2000 |
| WO | 01/92071 A1 | 12/2001 |

OTHER PUBLICATIONS

International Search Report, dated Apr. 13, 2007.

* cited by examiner

ENERGY ABSORBING DEVICE OPERATING WITH A FREE-FLOWING MEDIUM

CROSS-REFERENCE TO RELATED APPLICATION

This is a continuation, under 35 U.S.C. §120, of copending international application PCT/EP2006/011928, filed Dec. 12, 2006, which designated the United States; this application also claims the priority, under 35 U.S.C. §119, of European patent application EP 05 027 133.7, filed Dec. 12, 2005; the prior applications are herewith incorporated by reference in their entirety.

BACKGROUND OF THE INVENTION

Field of the Invention

The invention relates to an energy absorbing device, in particular for single-use occupant protection in vehicles. The device includes a container containing a magneto-rheological medium which, when an external force, in particular a shock, impulse or impact acts, is forced through at least one constriction, and having a device which generates a magnetic field and has the purpose of influencing the flow resistance of the constriction.

A device of the general type is described, for example, in German published patent application DE 100 01 420 and its counterpart U.S. Pat. No. 6,749,045 B2. There, there is disclosed an element of the type of a shock absorber in which an electro-rheological fluid which is contained in a cylinder is forced by a piston through an annular gap whose external and internal boundary faces are embodied as electrode faces. Changing the electrical field which can be applied influences the viscosity of the fluid and the flow resistance of the annular gap. However, the document (DE 100 01 420, U.S. Pat. No. 6,749,045) does not contain any details on a design with a magneto-rheological fluid or a coil which generates a magnetic field.

In applications with magneto-rheological fluids it is generally possible to differentiate between low pressure systems and high pressure systems. Shock absorbers, seat dampers, fitness devices etc. are low pressure systems in which repeated action in a piston cylinder system or the like is intended to build up an internal pressure in the magneto-rheological fluid of no more than approximately 50 bar. The low pressures are achieved by the ratio between the cylinder diameter and piston diameter, and because of the coil in the piston relatively large piston diameters are necessary here. This is different with devices which absorb impact energy since they are not used repeatedly. Sealing problems do not occur here either. Pressures in the region between 50 bar and approximately 200 bar occur, which greatly reduces the necessary volume of the expensive magneto-rheological fluid.

An energy absorbing device which is installed in the steering column of a motor vehicle is known, for example, from U.S. Pat. No. 5,870,930. The steering column has parts which can be pushed into one another in the manner of a telescope wherein one part is provided with an annular container into which a suitable fluid, for example a free-flowing silicone, is filled. A collar is fitted onto the second part and dips into the container in the manner of a piston and forces the fluid out through the ring of small openings in the event of an impact. The openings are covered by an annular burst element.

International PCT publication WO 00/37298 also describes, inter alia, an adjustable steering column with a locking device which has two cylinders which are joined by means of a cylindrical tapered section and are filled with magneto-rheological fluid. The tapered section is assigned a permanent magnet, if appropriate also an electromagnet, which blocks the throughflow of medium as soon as the steering column is secured in the desired position.

Impact energy absorbing devices are advantageous and/or necessary in vehicles not only on the steering column but also on a series of other components, for example on head rests, seat belts, seats and seat elements etc. In an extreme case, there may be more than 20 different installation locations in a motor vehicle.

Components on seat belts, airbags etc. which are relevant for a collision can at present usually be triggered in one stage, at maximum in two stages. Multi-stage triggering is extremely costly, and variable triggering has been impossible until now.

It is accordingly an object of the invention to provide an impact absorption device, which overcomes the above-mentioned disadvantages of the heretofore-known devices and methods of this general type and which enables variable triggering and impact energy absorption though the entire crumple distance.

With the foregoing and other objects in view there is provided, in accordance with the invention, an energy absorbing device, in particular for single-use occupant protection in motor vehicles. The device comprises:

a container containing a magneto-rheological medium;

at least one constriction adjoining said container, wherein said magneto-rheological medium is forced through said constriction on being subjected to an external force; and a device for generating a magnetic field and for influencing a flow resistance of said magneto-rheological medium through said constriction; and an outlet duct communicating with said constriction and being surrounded by the energy absorbing device.

The steering column, by way of example, should absorb a large part of the impact energy of the driver, that is to say be of rigid design, while the opposing force should be approximately 8000 N. If the driver is wearing a seat belt and is lightweight, an opposing force of 2000 N is sufficient. The much too high opposing force of 8000 N can lead to serious or even fatal injuries in the case of lightweight drivers who are wearing a belt. If the steering opposing force is, however, set at 2000 N, a driver who is not wearing a belt would be decelerated too slowly and would be forced against the end stop of the steering column movement with a high degree of residual energy. Since this also results in serious injuries, an attempt is made to optimize the airbag and the seat belt so that this combination absorbs the majority of the impact energy of the driver and there is only a small amount of residual energy left for the steering column so that a small opposing force is sufficient. However, this does not solve the problem of variable adaptation, but only partially displaces it.

This is disadvantageous for the deceleration values of the driver's body since valuable distance is not exploited. It is possible to divide the impact into two distances, specifically into a first deceleration distance during the airbag function and seat belt function, which is on average approximately 40 cm, and into a subsequent second deceleration distance during the deformation of the steering column, which is up to approximately 10 cm. The person's body must therefore be decelerated to a high degree in the first deceleration distance so that the residual energy at the transfer to the second deceleration distance is low. The deceleration is inversely proportional to the distance, i.e. the small second deceleration distance means a high level of deceleration. However, since only small opposing forces should be available in the second distance in order to avoid putting a lightweight driver in danger, a high level of deceleration is accepted in the first distance, with the result that the person's body is heavily loaded during the first distance, and excessively loaded in the case of small and lightweight persons. The stated average distance of 40 cm for the first deceleration distance refers to a driver of average size. In the case of small persons who are seated significantly closer to the steering wheel, the first deceleration distance is significantly shorter, and is approximately 25 cm. The proportion of the overall deceleration distance which is formed by the second deceleration distance is therefore increased to approximately a third without the opposing force which is set for lightweight drivers being able to be changed. The deceleration which is configured for heavy persons in the first deceleration distance must therefore become even larger and is in some cases even so large that the person's body is thrown backward. In many vehicles, the airbag can therefore be switched off for lightweight drivers and small drivers, but in such a case the increased opposing force function must then be performed by the steering system.

It is appropriate and effective to use the entire distance (approximately 50 cm in total) and always to adequately decelerate in the sum of the distances. This is the only way to bring about a smaller degree of loading on the body, and is possible only with a controllable system in which the magneto-rheological medium is subjected to the magnetic field for a sufficiently long time. Therefore, according to the invention, in a device of the type mentioned at the beginning with a controllable energy absorber in which not only is the energy absorption set as a function of the deceleration of the vehicle, the impact angle, the mass of the driver etc. but also said energy absorption can be changed during the impact, the constriction is provided with an outlet duct which surrounds the device for generating the magnetic field. The impact time is of course very short and is in particular between 30 to 100 milliseconds according to the EuroNCAP test (European New Car Assessment Programme). The length of the outlet duct is dimensioned here in such a way that the dwell time in which each magnetizable particle is located in the medium in the magnetic field is long enough for all the particles to be aligned completely. This time is at least one millisecond.

The length of the outlet duct is calculated from the formula:

$$L \geq \frac{V_m t_v}{(t_a - t_v).F} \quad \text{or} \quad L \geq \frac{X.Y.Z.t_v}{(t_a - t_v).B.H},$$

in which
  $V_m$ is the volume of the medium in the container, where
  X is the width of the receptacle space of the container,
  Y is the height of the receptacle space of the container, and
  Z is the length of the receptacle space of the container,
  $t_v$ is the dwell time,
  $t_a$ is the impact time, and
  F is the cross-sectional area of the outlet duct where
  B is the width of the outlet duct, and
  H is the height of the outlet duct.

Since the minimum dwell time is approximately 1% to 2% of the impact time, it can also be ignored in an approximate calculation, as a result of which the calculated length of the outlet duct increases by approximately 1% to 2%. As is apparent, a longer dwell time has a direct effect on the length of the outlet duct, but in many cases the installation space present permits only the minimum length.

There are various possible ways of influencing the flow resistance of the constriction. On the one hand it is conceivable to change the cross section, for example by subdivision into a plurality of ducts which can be blocked individually, using adjustable slides, shutters etc. or by means of at least one valve with a plurality of opening positions.

Furthermore it is possible to vary the discharge quantity per time unit, for example by means of containers with a cross-sectional area which can vary over the length so that the quantity which is forced out per unit of distance or time fluctuates.

Since a relatively small amount of energy has to be supplied to magneto-rheological fluids to establish or change the field, in one preferred embodiment the flow resistance of the constriction can be regulated by means of a variable magnetic field. In this context, the flow capability of the magneto-rheological medium is influenced, and at the same time the energy absorption can be adapted to different initial states and conditions and neither seals nor mechanical moving parts are necessary. This is particularly important for the function in an emergency since impact damping devices cannot be used at all in most cases so that their functional capability cannot normally be tested.

In a piston cylinder system, the pressure face of the piston must not be too small since otherwise the pressure becomes too high. If 200 bar pressure, that is to say 20 N/mm² pressure per unit surface area is not to be exceeded, a pressure face of 4 cm² is required for an impact force of 8000 N, which corresponds to a piston diameter of approximately 2.25 cm. The larger the piston diameter, the smaller the pressure in the cylinder, which is advantageous but the larger the expelled quantity of fluid, which is disadvantageous, with the volume from the pressure face of 4 cm² being calculated as a multiple of the travel corresponding to the deformation of the steering column that is to say approximately 10 cm, and in this example 40 cm³, that is to say 40 ml. The volume flow is a product of the pressure face and the movement speed of the piston, which is derived from the deformation speed in the event of an impact (up to 5 m/s), said volume flow being a resulting volume per time unit to be magnetized, and a specific cross-sectional area of the constriction.

The constriction has an inlet opening which is preferably rectangular and is bounded by the side walls of the container, wherein the side walls which form relatively long rectangular sides converge to form the opening, with the result that a narrow slit is formed. The subsequent outlet duct preferably has the same cross section and is made to extend through the gap between two iron parts forming magnet poles, of the device which generates the magnetic field. In order to keep the distance between the two poles small—the height of the gap should be less than 5 mm—the two broad walls of the outlet duct can be interrupted in the region of the iron parts, with the result that the medium comes directly into contact with the pole faces. Since the cross-sectional area must not be made smaller, a reduction in the height of the gap leads, however, to a widening of the outlet duct. Gap heights which can be used structurally are therefore between 1 mm and 3 mm. A possible optimum design provides here for the cross-sectional area of the outlet duct to be at least 10% of the cross-sectional area of the container.

The two iron parts may be permanently magnetic, and in this context the magnetic field can be strengthened or weakened by the magnetic field of a controllable coil, if appropriate said magnetic field can also be deactivated.

In another embodiment, the two iron parts can be magnetized by means of a controllable coil in order to increase the flow resistance from a lower limiting value. Said value may be dependent, for example, on the viscosity of the non-magnetic medium and of a burst element which, if appropriate, covers the opening and which clears the opening at a specific pressure of the medium.

In particular a capacitor is provided for the power supply, but some other suitable power source, for example an accumulator, is also conceivable if it is available at the location of use.

In this context the magnetic field must act on the entire outlet duct magnetically over its length but not over its width. For example, the magnetic field could also be provided in the two edge regions so that a central part of the medium flows through the outlet duct without being influenced.

Furthermore, the outlet duct in the magnetic field can also be supplemented by means of a bypass duct which can be switched on or off. As a result, the range of the opposing force can be increased. The bypass could also lead "into the open air," which is advantageous in the case of very high forces since the adjustment range is made larger.

Other features which are considered as characteristic for the invention are set forth in the appended claims.

Although the invention is illustrated and described herein as embodied in an energy absorption device with a flowable operation medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
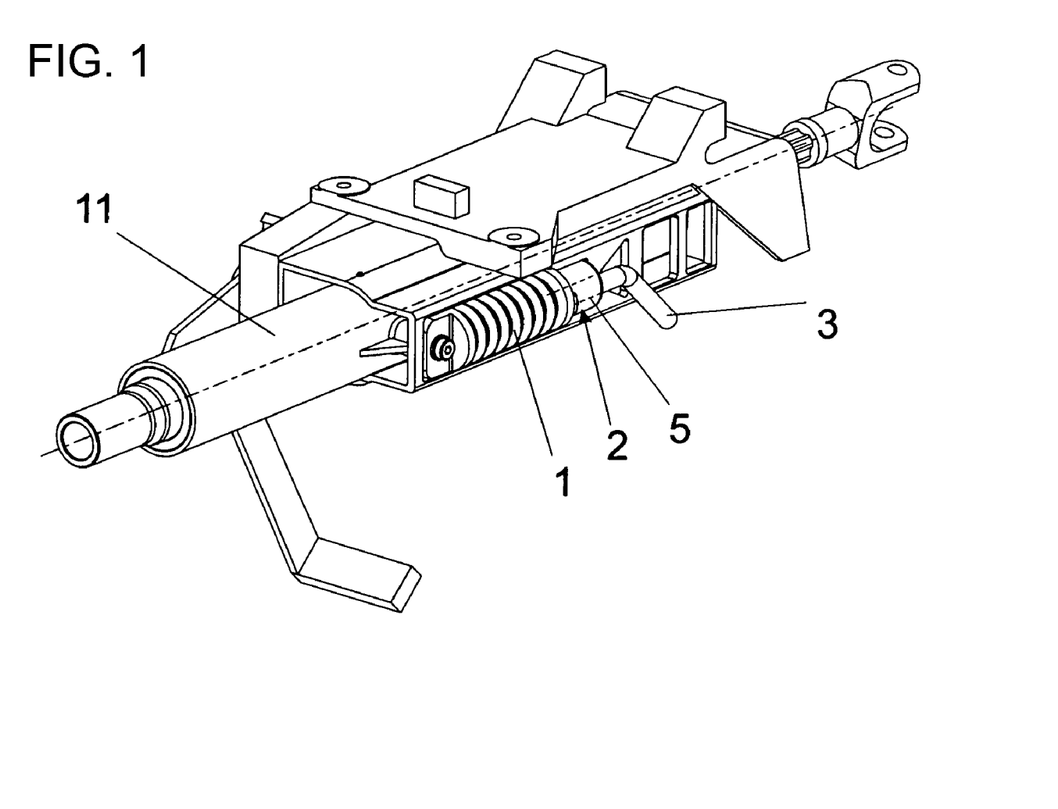
FIG. 1 is a perspective view of a schematic detail of a steering column with a device according to the invention.

Referring now to the figures of the drawing in detail and first, particularly, to FIG. 1 thereof, the apparatus according to the invention An energy absorbing device can, as shown in FIG. 1, be provided, for example, on a steering column 11 parallel to its parts which can be longitudinally displaced in the event of a collision. The device has a container 1 whose volume can be reduced and in which a magneto-rheological fluid is contained. The container 1 is secured at one end to a displaceable part of the steering column 11, while the other end which is adjoined by an outflow line 3 is adjacent to or secured to a non-displaceable part of the steering column 11. In the event of an impact, the steering column 11 can become shorter and the fluid contained in the container 1 is forced out through a constriction 4 and its outlet duct 5 into the outflow line 3, while the flow resistance of the constriction 4 slows down the forcing out of the fluid so that impact energy is absorbed.

The outlet duct 5 is surrounded by a device 2 for generating a variable magnetic field. The device 2 comprises an electromagnet by means of which a magnetic field is generated or the magnetic field of a permanent magnet is influenced. The electromagnet can be actuated as a function of various criteria such as weight and sitting position of the driver etc. by means of signals from sensors which monitor an impact, while the variable magnetic field changes the viscosity of the fluid which is to be forced through the constriction, and the opposing force becomes larger or smaller.

Figure 2:
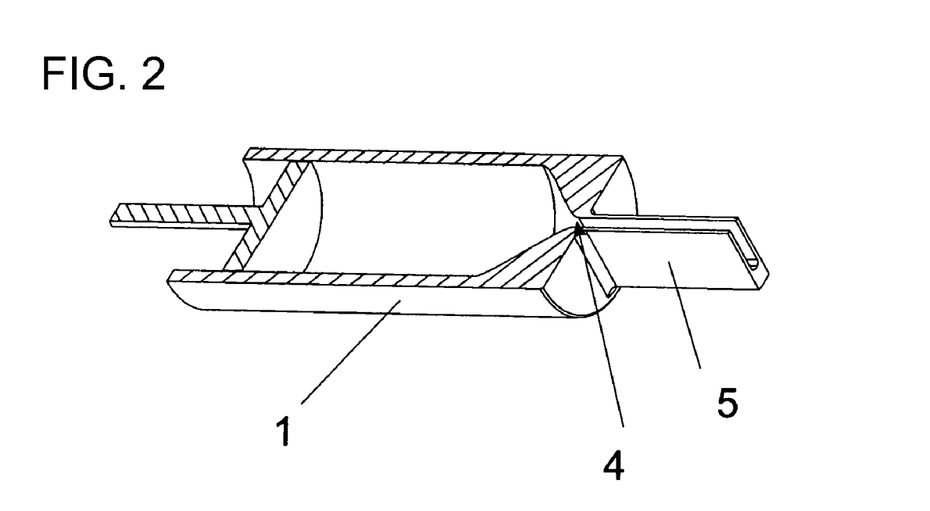
FIG. 2 is a perspective view of a longitudinal section through a container of the device according to the invention.

Details can be seen better in FIG. 2. The container 1 which has any desired cross section tapers to form a rectangular flat opening at the constriction 4 and its adjoining outlet duct 5 which opens into the outflow line 3. The walls of the outlet duct 5 are preferably made of non-magnetic material.

Figure 3:
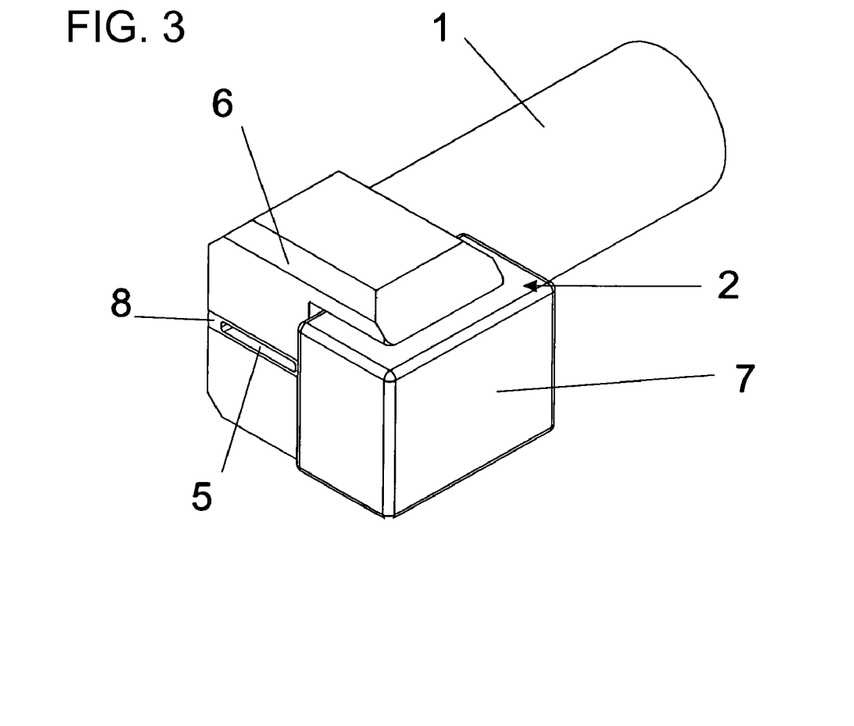
FIG. 3 is a perspective schematic view of a device according to the invention.
Figure 4:
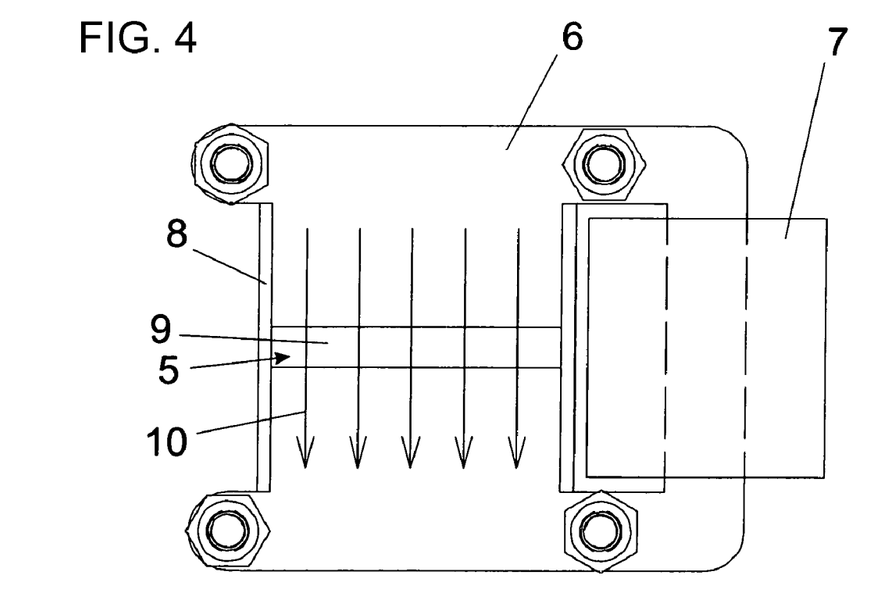
FIG. 4 shows an end view of the device according to FIG. 3 with a magnetic field profile.

FIGS. 3 and 4 show the design of the device 2 for generating the variable magnetic field 10 with C-shaped iron elements 6 to which a coil 7 is assigned. The outlet duct 5 penetrates the gap 9 between the pole faces of the iron elements 6. As shown in FIG. 4, the two broad walls of the outlet duct can be removed at the iron elements 6 so that only the narrow walls 8 are present. The gap 9, which at maximum has a height of 5 mm, preferably between 1 mm and 3 mm, is minimized as a result of this, and the magneto-rheological fluid is in direct contact with the pole faces.

Figure 5:
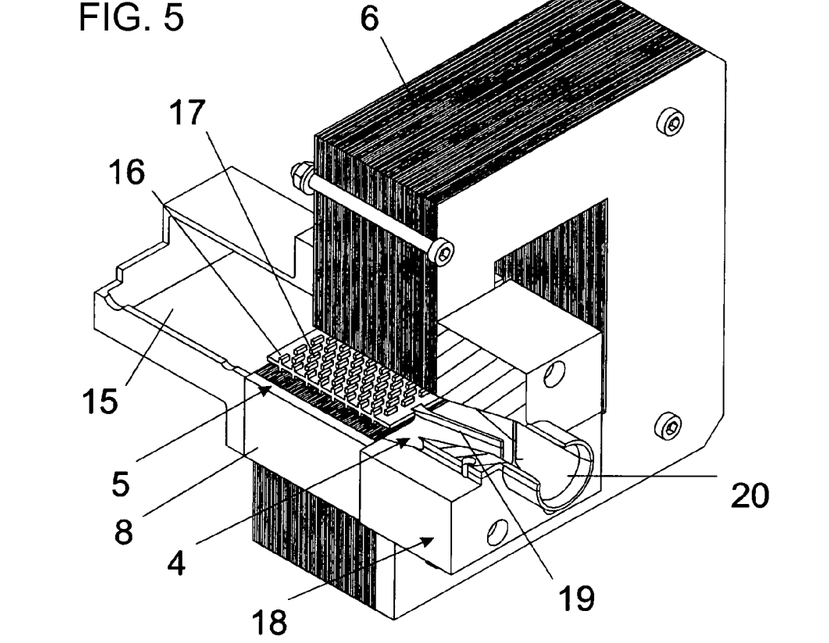
FIG. 5 shows a partial section through a preferred embodiment of the device.

FIG. 5 shows structural details of a device according to the invention in a partial section. The outlet duct 5 which leads through the iron elements 6 is divided by a dividing plate 16, from which webs 17 protrude upward on both sides. The dwell time of the medium in the outlet duct 5 is prolonged by the installation parts 16, 17, with the result that the medium is subjected to the magnetic field for a longer time without the electromagnet having to be made larger. The dwell time should be at least one millisecond, preferably at least one and a half milliseconds, in order to achieve sufficient magnetization even when there are force peaks which bring about extremely high flow speeds through the outlet duct 5. Further possible ways of prolonging the dwell time are to form uneven portions in the boundary walls 8 of the outlet duct 5, end faces of the iron elements 6 which alternately project into the gap 9 and are set back, or a single deflection or multiple deflections of the entire outlet duct 5, for example in the manner of baffles.

Instead of the outflow line, a collecting container 15 is provided at the end of the outlet duct 5 in FIG. 5. The constriction 4 is formed in this embodiment on a, in particular, two-part container head 18 which is provided with guiding webs 19 which lead to the outlet duct 5 and have the purpose of uniformly distributing and introducing the medium. The container head 18 has a threaded connector 20 onto which the container 1 can be screwed with a corresponding thread which supports the opening.

If the magnetic field has been switched on at the beginning, the relatively high opposing force is added to the forces of inertia of the component and the impact/impulse forces resulting in a high opposing force peak. For this reason it is better if the magnetic field is switched off until the first load peak has passed and all the components are accelerated. Only after this (after approximately 3 ms) should the magnetic field be built up very quickly (in the range of approximately 10 ms). As a result, the opposing force curve can be adapted even better to the conditions and can be regulated as the medium flows through the outlet duct 5, for example with adaptation to a detection of a driver's position and/or driver's weight, a measurement of acceleration and so on.

Figure 6:
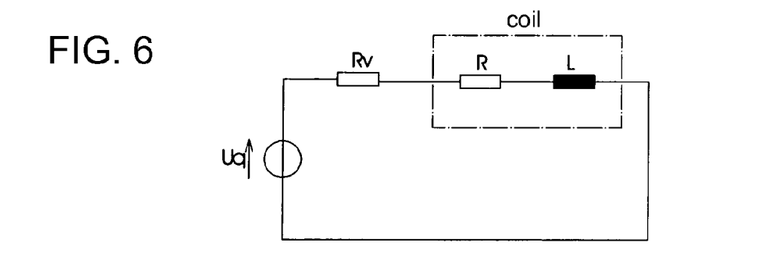
FIGS. 6 and 7 are two circuit diagrams relating to the acceleration of the build up of the magnetic field.
Figure 7:
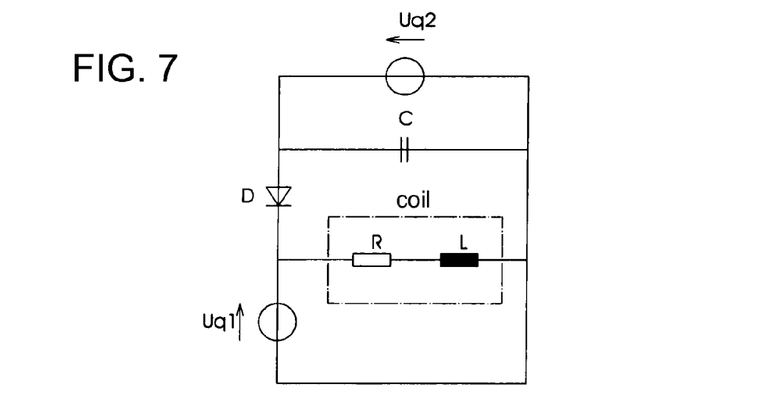

In order to build up the magnetic field quickly, there are, for example, the circuits shown in FIGS. 6 and 7. Since the time constant L/R according to which approximately 63% of the magnetic field is built up becomes smaller the greater the resistance R, the rapid build up of the magnetic field can be achieved according to FIG. 6 by means of a series resistor Rv which is connected in series with the coil of the device 2 and is then bypassed or switched off.

FIG. 7 shows a possible way of charging a capacitor C from a separate, second voltage source Uq2 and passes on, together with a diode D, a high voltage to the coil of the device 2 at the first moment. The short voltage peak is approximately 2 to 3 times the voltage which is supplied by the first voltage source Uq1 with which the magnetic field is subsequently kept to the desired magnitude.

FIGS. 1 and 2 show cylindrical containers 1 which are embodied according to FIG. 1 in the manner of a folding bellows and can therefore be compressed and which, according to FIG. 2, can contain a piston in order to force out the fluid. Since the cross-sectional face of the container is essentially constant over its length, the flow resistance of the constriction 4 also remains the same since the same quantity is forced through per unit of distance or time.

Figure 8:
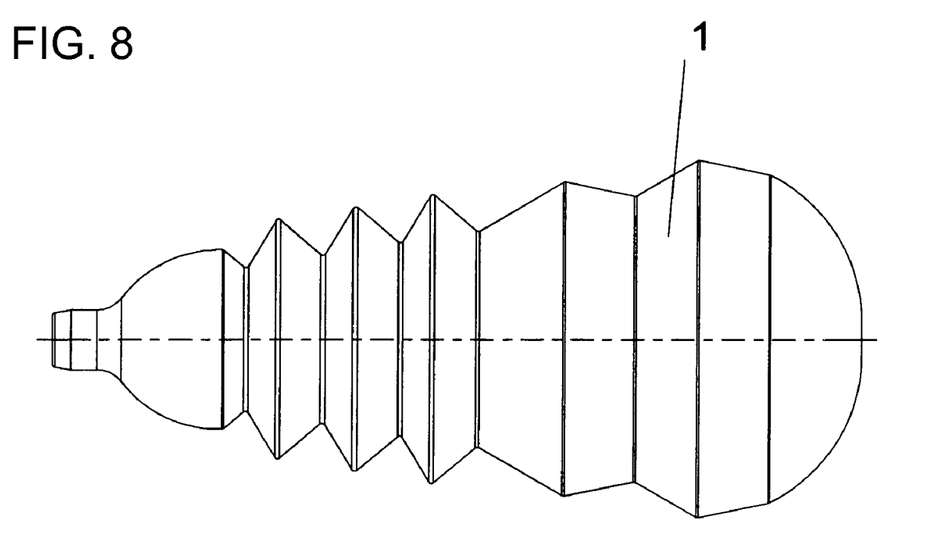
FIGS. 8 and 9 show a container for a progressive opposing force profile.
Figure 9:
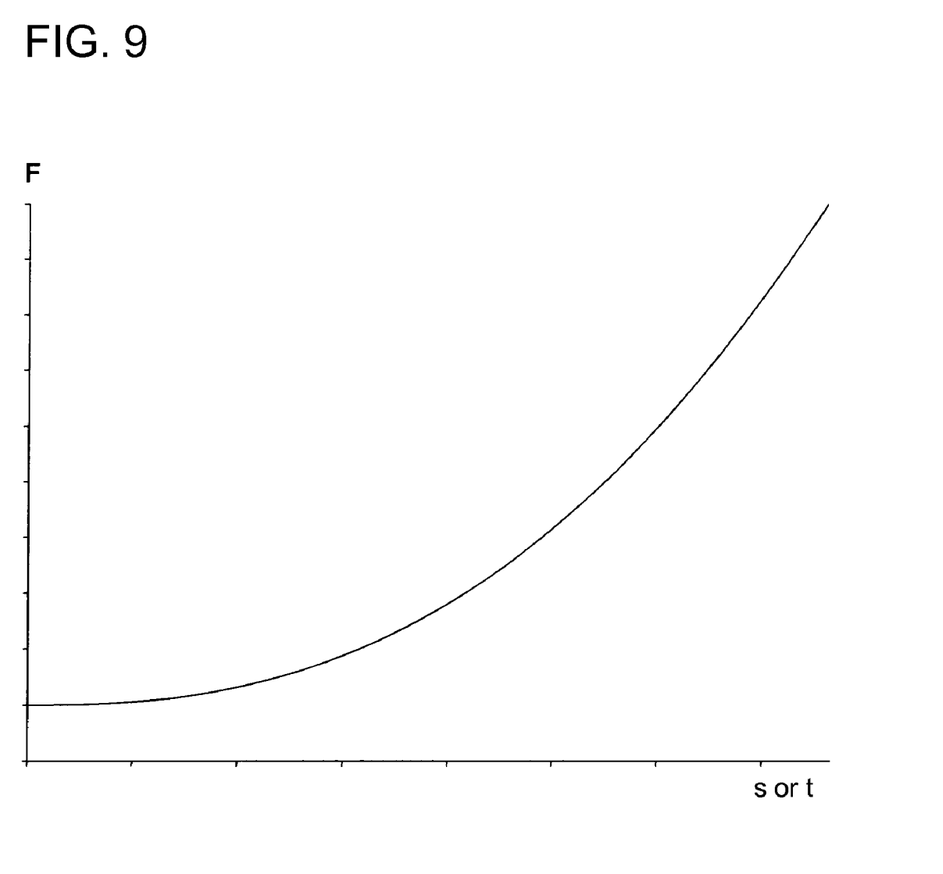
Figure 10:
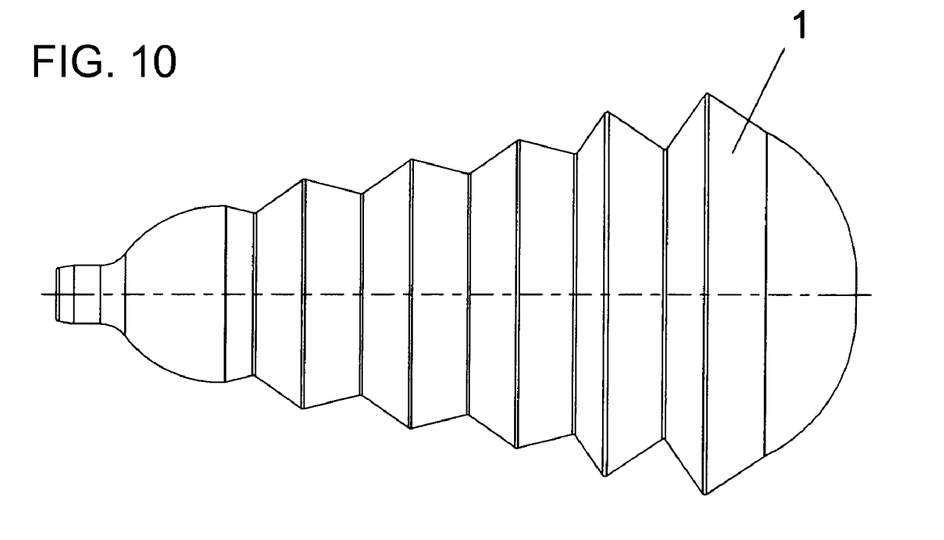
FIGS. 10 and 11 show a container for a degressive opposing force profile.
Figure 11:
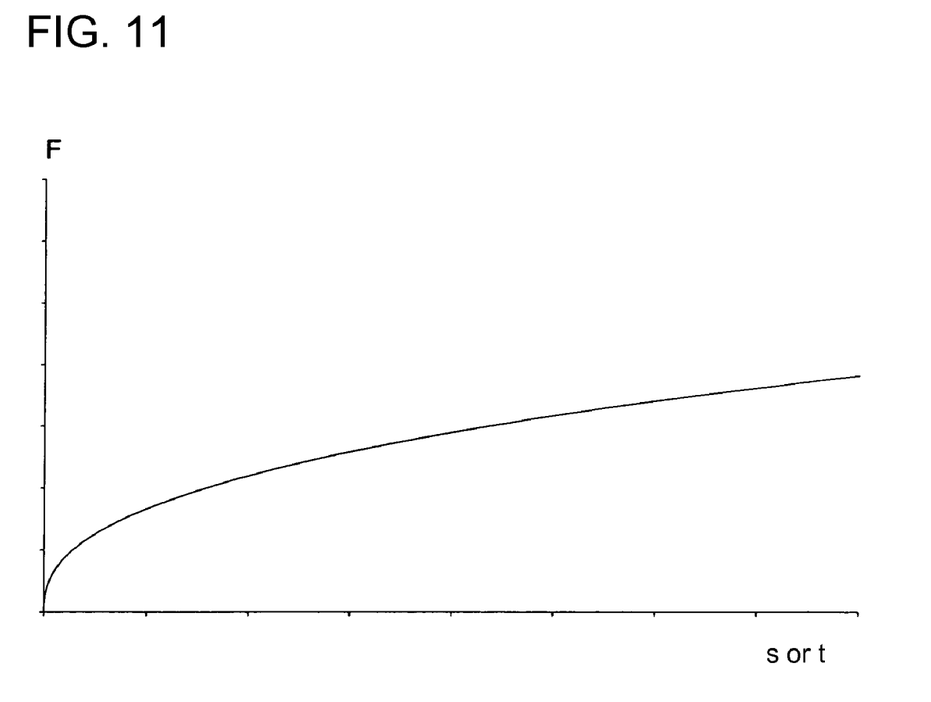
Figure 12:
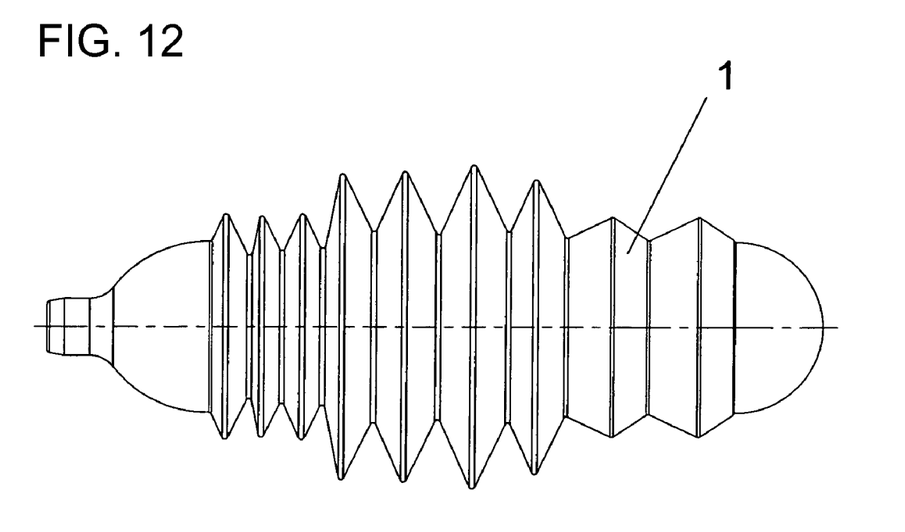
FIGS. 12 and 13 show a container for a variable opposing force profile.
Figure 13:
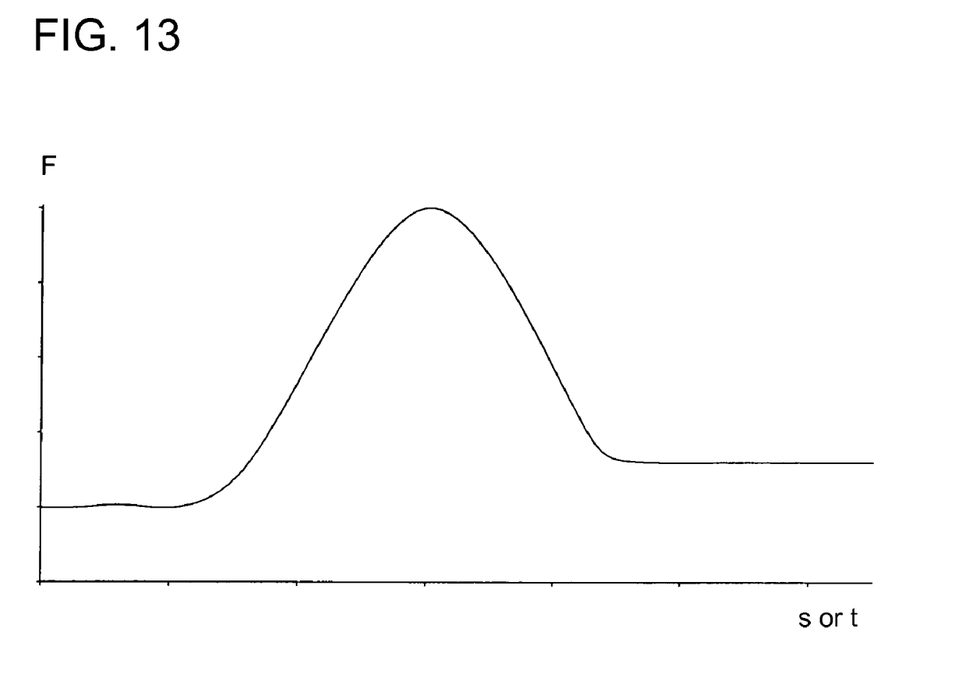

FIGS. 8, 10 and 12 show alternatives in which the flow resistance F can be progressive, degressive or fluctuating without being influenced at the constriction. FIG. 8 shows a compressible container 1 whose cross section becomes increasingly large away from the opening so that, as FIG. 9 shows, the flow resistance F becomes increasingly large. FIG. 2 shows a compressible container 1 whose cross section firstly becomes greater to a larger extent and then to a smaller extent away from the opening, with the result that the flow resistance F (FIG. 11) increases initially to a greater extent and later to a lesser extent. FIG. 12 finally shows a compressible container 1 whose cross section is largest in the center, with the result that the flow resistance F rises and then falls again (FIG. 13).

The statements regarding FIGS. 8 to 13 show that the flow resistance of the constriction 4 can be selected by means of a corresponding shape of container, with the result that a regulating device is not necessary at the constriction 4 in order to generate a varying flow resistance. Different impact damping values can already be achieved by means of the corresponding shape of container. However, the regulating device 2 at the constriction 4 permits variability of the flow resistance as a function of various criteria.

If an accident occurs, the impacting of the upper part of the person's body against the steering wheel reduces the volume of the container 1, and the device 2 regulates the flow of medium through the outlet duct 5 as a result of a corresponding change in the viscosity as a function of signals of a computer which processes various measurement data and parameters. When the device is not in use, the electromagnet is de-energized and the medium which is contained has low viscosity. A burst element which covers the opening of the container prevents medium from flowing out unintentionally, said burst element breaking at a specific pressure. Therefore, only in the event of an accident is the electromagnet excited in order to increase and reduce the viscosity of the magneto-rheological medium. Alternatively, the medium can also be enclosed in a sealed capsule, for example in a foil bag, which is inserted into the container and bursts as a result of the pressure. The capsule also makes the burst element unnecessary.

A capacitor which is accommodated, for example, in the region of the steering wheel is sufficient as a power source, with the result that the system remains functionally capable even if the power supply of the motor vehicle fails. If the power supply or the electronics fail completely, the flow resistance of the constriction alone is sufficient in all cases, said flow resistance having, for example, a magnitude of 2000 N.

Figure 14:
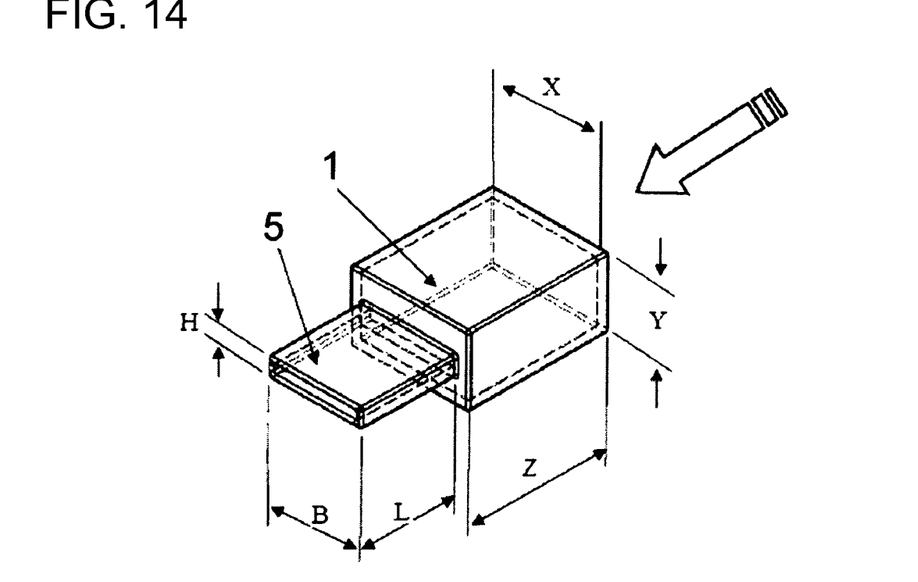
FIG. 14 is a schematic illustration of the container and of the constriction.

FIG. 14 is a schematic view of the sizes of the container 1 and of the outlet duct 5 which are used in the above formula for the calculation of the length L of the outlet duct 5.

Figure 15:
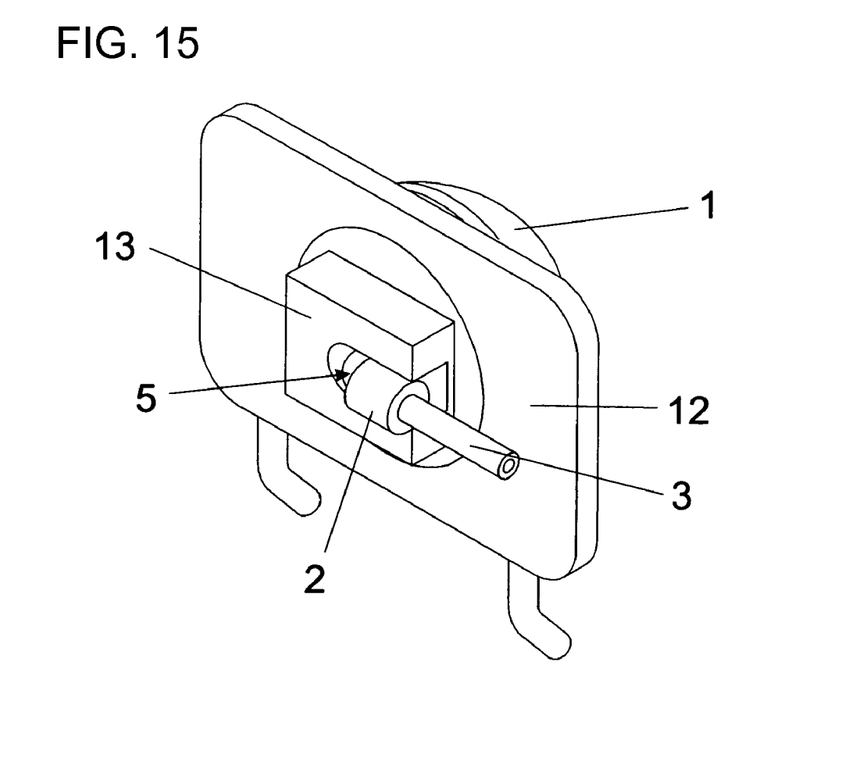
FIG. 15 is a schematic illustration of the device according to the invention as part of a head rest.

FIG. 15 is a schematic view of an impact damping head rest 12. The container 1 is not cylindrical here but rather in the form of a relatively flat can which can also be compressed if the head of a person strikes the head rest 12. The outlet duct 5 is bent and in turn surrounded by the device 2. An electronic system by means of which the device is actuated is denoted by 13.

The invention claimed is:

1. An impact energy absorbing device configured for single-use occupant protection in a motor vehicle, comprising:
    a container containing a magneto-rheological medium, said container being formed with an opening and having a burst element covering said opening to prevent said magneto-rheological medium from unintentionally flowing out of said container;
    an outlet duct communicating with said opening and having a substantially rectangular cross-sectional area, said magneto-rheological medium being irreversibly forced out of said container through said opening into and through said outlet duct on being subjected to an external force of said impact sufficient to break said burst element; and
    a device sandwiching said outlet duct for generating a magnetic field and for influencing a flow resistance of said magneto-rheological medium when forced through said outlet duct, said device comprising two iron parts forming magnet poles disposed with a gap therebetween, wherein said outlet duct extends through said gap between said magnet poles and has a length L defined by the following formula:

$$L \geq \frac{V_m t_v}{(t_a - t_v) \cdot F}$$

where
    $V_m$ is a volume of the medium in the container;
    $t_v$ is a dwell time;
    $t_a$ is an impact time; and
    F is a cross-sectional area of said outlet duct.

2. The device according to claim 1, wherein said outlet duct has walls composed of non-magnetic material.

3. The device according to claim 1, wherein said outlet duct has a substantially rectangular cross-sectional area with two broad walls, and said broad walls are interrupted in a region of said iron parts.

4. The device according to claim 1, which comprises devices for increasing the flow resistance disposed in said outlet duct.

5. The device according to claim 1, wherein a cross-sectional area of said outlet duct is at least 10% of a cross-sectional area of said container.

6. The device according to claim 5, wherein a height of said outlet duct is at most 5 mm.

7. The device according to claim 6, wherein the height of said outlet duct is between 1 mm and 2.5 mm.

8. The device according to claim 1, wherein said container has side walls converging to form a constriction adjacent said opening.

9. The device according to claim 1, wherein said device for generating the magnetic field comprises at least one permanent magnet, and a controllable electromagnet for varying a magnetic field of said permanent magnet.

10. The device according to claim 1, wherein said device for generating the magnetic field comprises at least one controllable electromagnet for generating a variable magnetic field.

11. The device according to claim 9, which comprises at least one capacitor or accumulator connected to and forming an energy source for said electromagnet.

12. The device according to claim 1, which comprises an electronic control system and at least one sensor.

13. A steering column, comprising the impact energy absorbing device according to claim 1.

14. A headrest, comprising the energy absorbing device according to claim 1.

15. A buffer suspension system, comprising the energy absorbing device according to claim 1.

16. A motor vehicle, comprising the device according to claim 1.

17. A seat belt device, comprising the impact energy absorbing device according to claim 1.

18. An impact energy absorbing device configured for single-use occupant protection in a motor vehicle, comprising:
a container containing a magneto-rheological medium, said container being formed with an opening and having a burst element disposed to prevent said magneto-rheological medium from unintentionally flowing out of said container;
at least one constriction adjoining said container;
an outlet duct communicating with said constriction and having a substantially rectangular cross-sectional area, said magneto-rheological medium being irreversibly forced through said constriction and said outlet duct on being subjected to an external force of said impact sufficient to break said burst element; and
a magnet device sandwiching said outlet duct for generating a magnetic field and for influencing a flow resistance of said magneto-rheological medium when forced through said constriction, said device comprising two iron parts forming magnet poles disposed with a gap therebetween,
wherein said outlet duct extends through said gap between said magnet poles and has a length allowing to vary flow properties of said magneto-rheological medium during its flow through said magnet device; and
an electronic control system connected to said magnet device and configured to drive said magnet device to thereby vary a flow resistance in said gap while said magneto-rheological medium flows through said gap.

19. An impact energy absorbing device configured for single-use occupant protection in a motor vehicle, comprising:
a container containing a magneto-rheological medium, said container being formed with an opening, and a sealed capsule encapsulating said magneto-rheological medium and preventing said magneto-rheological medium from unintentionally flowing out of said container;
an outlet duct communicating with said opening and having a substantially rectangular cross-sectional area, said magneto-rheological medium being irreversibly forced out of said sealed capsule and out of said container through said opening and said outlet duct on being subjected to an external force of said impact sufficient to burst said capsule; and
a device sandwiching said outlet duct for generating a magnetic field and for influencing a flow resistance of said magneto-rheological medium when forced through said opening, said device comprising two iron parts forming magnet poles disposed with a gap therebetween, wherein said outlet duct extends through said gap between said magnet poles and has a length L defined by the following formula:

$$L \geq \frac{V_m t_v}{(t_a - t_v).F}$$

where
$V_m$ is a volume of the medium in the container;
$t_v$ is a dwell time;
$t_a$ is an impact time; and
F is a cross-sectional area of said outlet duct.

* * * * *